(12) United States Patent
Kim et al.

(10) Patent No.: US 7,689,495 B1
(45) Date of Patent: Mar. 30, 2010

(54) SYSTEM AND METHOD FOR PROCESSING TRADES USING VOLUME-WEIGHTED-AVERAGE PRICING TECHNIQUES

(75) Inventors: Bang Kim, Englewood, NJ (US); Slone Jonathan, New York, NY (US)

(73) Assignees: Bloomberg L.P., New York, NY (US); Global Execution Technologies Ltd., Hamilton (BM)

( * ) Notice: Subject to any disclaimer, the term of this patent is extended or adjusted under 35 U.S.C. 154(b) by 0 days.

(21) Appl. No.: 09/562,506

(22) Filed: May 1, 2000

(51) Int. Cl.
*G06Q 40/00* (2006.01)
(52) U.S. Cl. .......................... 705/37; 705/35
(58) Field of Classification Search .............. 705/10–44
See application file for complete search history.

(56) References Cited

U.S. PATENT DOCUMENTS

| | | | |
|---|---|---|---|
| 3,573,747 A | 4/1971 | Adams et al. | |
| 4,412,287 A | 10/1983 | Braddock, III | |
| 4,674,044 A | 6/1987 | Kalmus et al. | |
| 5,038,284 A | 8/1991 | Kramer | |
| 5,727,165 A | 3/1998 | Orish et al. | |
| 5,787,402 A * | 7/1998 | Potter et al. | 705/37 |
| 5,845,266 A | 12/1998 | Lupien et al. | 705/37 |
| 5,873,071 A | 2/1999 | Ferstenberg et al. | |
| 5,905,974 A | 5/1999 | Fraser et al. | |
| 6,012,046 A | 1/2000 | Lupien et al. | 705/37 |

FOREIGN PATENT DOCUMENTS

WO   WO 98/13778   4/1998

OTHER PUBLICATIONS

"Ashton Technology Canada and The Toronto Stock Exchange Sign Agreement to Operate eVWAP in Canada," Jun. 12, 2000, http://www.ashtontechgroup.com/press/061200.html.
"Want to get close to VWAP," ITG Connect's VWAP SmartServerTM web site, http://www.itginc.com/connect/99_fall/vwap.html.
"ITG VWAP Strategy," ITG Connect's VWAP SmartServerTM web site, http:www.itginc.com/research/vwapinsert.html.
"The eVWAPTM Trading Syste," and related materials from the eVWAP.com web site, http://www.evap.com.
"Smarts Analytics . . . Achieving VWAP," Aug. 6, 1999, http:www.smarts.comm.au/02a_VWAP_Case.html.
"Volume Weighted Average Price: Evaluation or Evasion?", Plexus Group, Aug. 1999.

* cited by examiner

*Primary Examiner*—Frantzy Poinvil
(74) *Attorney, Agent, or Firm*—Frank J. DeRosa; Jon Gordon; Frommer Lawrence & Haug LLP (57) ABSTRACT

A computerized system and method electronically conduct trades in securities, display information corresponding to orders, match the orders, and price the matched orders on the basis of volume-weighted-average price (VWAP). Orders are matched of buyers and sellers who wish to trade designated quantities of securities at a price based on the VWAP for the security in question determined with reference to a defined time period, which is set in advance of order matching, and may consist of an entire trading day on the market on which the security is traded or a portion thereof as determined by the trading parties and/or the disclosed system. VWAP trading is facilitated by displaying, over an output device, orders entered on the "buy" side and "sell" side. Trades of matched orders are continuously and/or non-continuously executed and the trades priced after the close of the relevant defined time period at the calculated VWAP.

41 Claims, 4 Drawing Sheets

FIG. 1

```
M1301 JP ¥  1 e140+17 T  136/140  23Kx105K           Equity GTVB
At 02:02  Vol 1,035,000 Op 139 T  Hi 143 T  Lo 135 T  ValTrd 144.949m
   Enter 1 <GO> to submit this new order BUY  10000  1301  KYOKUYO
                G-Trade Services: (441) 298-9920

Display Qty        1000
  VWAP Type       VF
  Reserve Qty        9000
  Total Qty          10000

Order Expires         Minutes
           At      0 : 0 : 0
  Send IOI        N  (Y/N)
```

FIG. 2

M1301 JP ¥ 1 e140+17 T 136/140 23Kx105K                Equity GTVP
At 02:02  Vol 1,035,000 Op 139 T  Hi 143 T  Lo 135 T  ValTrd 144.949m
    12:31        TRADEBOOK  VWAP  MONITOR
           Day VWAP    1st Session   2nd Session   Point of Trade
           Bid    Ask   Bid    Ask    Bid    Ask    Bid    Ask
1 1808                                       5000
2 3011                                                      3000
3 1601     5000
4 1301     1000              3000
5 FP              2600
6 6758     1000                                     1000

FIG. 3

| GTBL | | | | | | | | DG21 g Equity GTBL | |
|---|---|---|---|---|---|---|---|---|---|

TRADEBOOK ORDER LIST  Page 1 / 1
ORDER DATE  4/24/2000  ADMINISTRATOR  :  BRUCE

| # | User | Ticker | Side | Limit | NPBD | ORDNO | Time | Open | Filled | Reserve |
|---|---|---|---|---|---|---|---|---|---|---|
| 1) | 97544 | 1808 | SELL | V2 | N | 14 | 12:31:00 | 5000 | | |
| 2) | 97544 | 3011 | SELL | VP | N | 13 | 12:30:22 | 3000 | | |
| 3) | 97544 | 1601 | BUY | VF | N | 12 | 12:29:18 | 5000 | | |
| 4) | 97544 | 1301 | SELL | V1 | N | 11 | 12:27:53 | 3000 | | |
| 5) | 97544 | 1301 | BUY | VF | N | 10 | 12:26:22 | 1000 | | 9000 |
| 6) | 113944 | FP | BUY | VF | N | 9 | 12:02:49 | | 200 | |
| 7) | 113944 | FP | SELL | VF | N | 8 | 12:03:50 | | | |
| 8) | 97544 | BOOT | BUY | VF | N | 7 | 11:59:17 | | | |
| 9) | 97544 | 6758 | SELL | VF | N | 6 | 11:56:58 | | | |
| 10) | 48971 | 6758 | BUY | VP | N | 5 | 11:48:31 | 1000 | | 2000 |
| 11) | 113944 | FP | BUY | VF | N | 4 | 11:27:27 | | 100 | |
| 12) | 113944 | FP | BUY | VF | N | 3 | 11:12:48 | | 100 | |
| 13) | 68817 | FP | SELL | VF | N | 2 | 11:12:40 | 2600 | 400 | |
| 14) | 47525 | 6758 | BUY | VF | N | 1 | 09:50:23 | 1000 | | |

Copyright 2000 BLOOMBERG L.P.  Frankfurt:69-920410  Hong Kong:2-977-6000  London:171-330-7500  New York:212-318-2000
Princeton:609-279-3000  Singapore:226-3000  Sydney:2-9777-8686  Tokyo:3-3201-8900  Sao Paulo:11-3048-4500
I511-148-2 24-Apr-00 12:27:50

Bloomberg PROFESSIONAL

FIG. 4

SYSTEM AND METHOD FOR PROCESSING TRADES USING VOLUME-WEIGHTED-AVERAGE PRICING TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

The present invention relates to electronic securities trading.

The volume-weighted average price (VWAP) of a security is an average price of the security in trades executed in a specified market during a defined time period, weighted according to the number of shares involved in the trades.

Known electronic VWAP trading systems typically provide fixed time periods for traders to enter orders blindly, for example, without the system providing any information concerning other VWAP orders or matched trades. After the time period for entering VWAP orders has expired, the trader is notified if and to what extent the order has been matched. Known electronic VWAP systems do not display orders or matched trades.

SUMMARY OF THE INVENTION

A computerized system and method provided by the invention for electronically conducting trades in securities displays information corresponding to orders, matches orders, and prices the matched orders on the basis of a volume-weighted-average price (VWAP). In a preferred embodiment, orders may be matched continuously or non-continuously. Different intervals (regular and/or irregular) at which orders are matched may be provided regardless of whether orders are matched continuously or non-continuously, or both continuously and non-continuously.

The disclosed method and system match orders of buyers and sellers who wish to trade designated quantities of securities at a price based on the VWAP for the security in question, determined with reference to a defined time period. The defined time period is set in advance of order matching, and may consist of an entire trading day on the market on which the security is traded or a portion thereof as determined by the trading parties and/or the disclosed system. The disclosed system and method match an order message entered by a seller with an equivalent message entered by a buyer. The order messages include an identification of the security and the quantity bid or offered, and may include the type of VWAP at which a trade, if matched, will be priced. In one embodiment, a VWAP type may be specified with an order, and matching an order also involves matching VWAP types. The match typically occurs before or during the defined time period with respect to which the VWAP is to be calculated.

The disclosed system and method facilitate VWAP trading by displaying, over an output device, orders entered on the "buy" side and "sell" side. The disclosed system and method continuously execute matched trades and price the matched trades after the close of the relevant defined time period at the calculated VWAP.

The disclosed method and system provide for entry of buy orders and sell orders for securities without specifying a currently-ascertainable price. Each participant agrees that the order (if matched with a counterparty's order) is to be executed at a VWAP to be computed over some defined time period agreed between the parties or imposed by the trading system. This defined VWAP time period may be entirely in the future relative to the time that the orders are entered or may be in part in the past and in part in the future. The orders specify a lot size. The disclosed method and trading system display these orders in real-time (where "real-time" includes the delays imposed by data entry, computer processing, and communications). In some embodiments, and as designated by the party placing the order, the size of the order may also be displayed to the market. In other embodiments, the identity of the order-entry firm and size of the order may be displayed. The buy and sell orders are matched to sell and buy orders of counterparties, typically on a time priority basis (that is, the order on one side of the market placed first in time is matched first, then the order on that side of the market next in time is matched, and so on), and then the matched orders are settled at the VWAP computed over a defined time period.

As disclosed above, the disclosed method and trading system specify a defined time period or periods over which a particular VWAP type is to be calculated. For instance, the defined time period may be the full current trading day of the relevant market, or the following trading day (especially if the trade is entered off-hours). A trading day may be divided into two or more discrete periods, for instance a morning and an afternoon session, and trades may be executed at the VWAP over one of the defined time periods as designated by the trader. Multiple trading days may be aggregated into a single VWAP period. Alternatively, the disclosed system may provide a rolling VWAP time period. For instance, the system may provide, and the parties may agree to use, a facility under which the VWAP time period is the next two trading hours (or some other agreed defined time period) from the moment that a buy order is matched to a sell order. In some embodiments, the average weighting function may incorporate other factors. For instance, the VWAP may weight trades earlier in the trading session more lightly, and trades following the matching more heavily.

The defined time period may be measured from the time the orders are matched through the end of either the market trading session (if less than a day), the market trading day or a greater period of time. In other embodiments, the settlement price of a VWAP trade matched during the course of a trading session or trading day is the VWAP of the security determined over the length of the entire VWAP trading session, such as the VWAP of all orders measured at the end of the trading day. The end of the trading day may be midnight on the day of the matching of the matched order. The VWAP may be determined from a specified start time to a specified end time. The specified start time is selected from a past time, a present time, or a future time relative to the time of matching of the orders. Alternatively, the specified end time is a future time relative to the time of matching of the orders.

The disclosed method and system may also provide for promoting entry of orders at a present time for matching and pricing with a VWAP determined at the specified end time in the future. In addition, settlement may also incorporate basis points, in which traders can trade around the VWAP; that is, the system may receive bid prices, for example, at the VWAP plus or minus one basis point, which the system may implement. Thus, the price of filled orders may be determined by a primary market but not be set by it.

The information in the system with respect to an order may include a displayed quantity and an undisplayed reserve quantity. The method may receive inputs from a trader to specify the displayed quantity and the reserve quantity, and also may receive inputs from the trader to specify a type of VWAP for which to perform the step of pricing. Also, the display of the order information may be without identification of the source of the orders, providing anonymity to traders entering the orders.

As the market closes, settlement of filled orders is performed with updated prices, and the order executions may then be fed automatically to front and back office systems for straight-through processing (STP).

The inventive method and system may be used with a trading interface that maintains the parties' anonymity in each order and trade, to provide client confidentiality through clearance and settlement, and to permit and encourage larger trading volumes and greater liquidity.

DETAILED DESCRIPTION OF THE PREFERRED EMBODIMENTS

Figure 1:
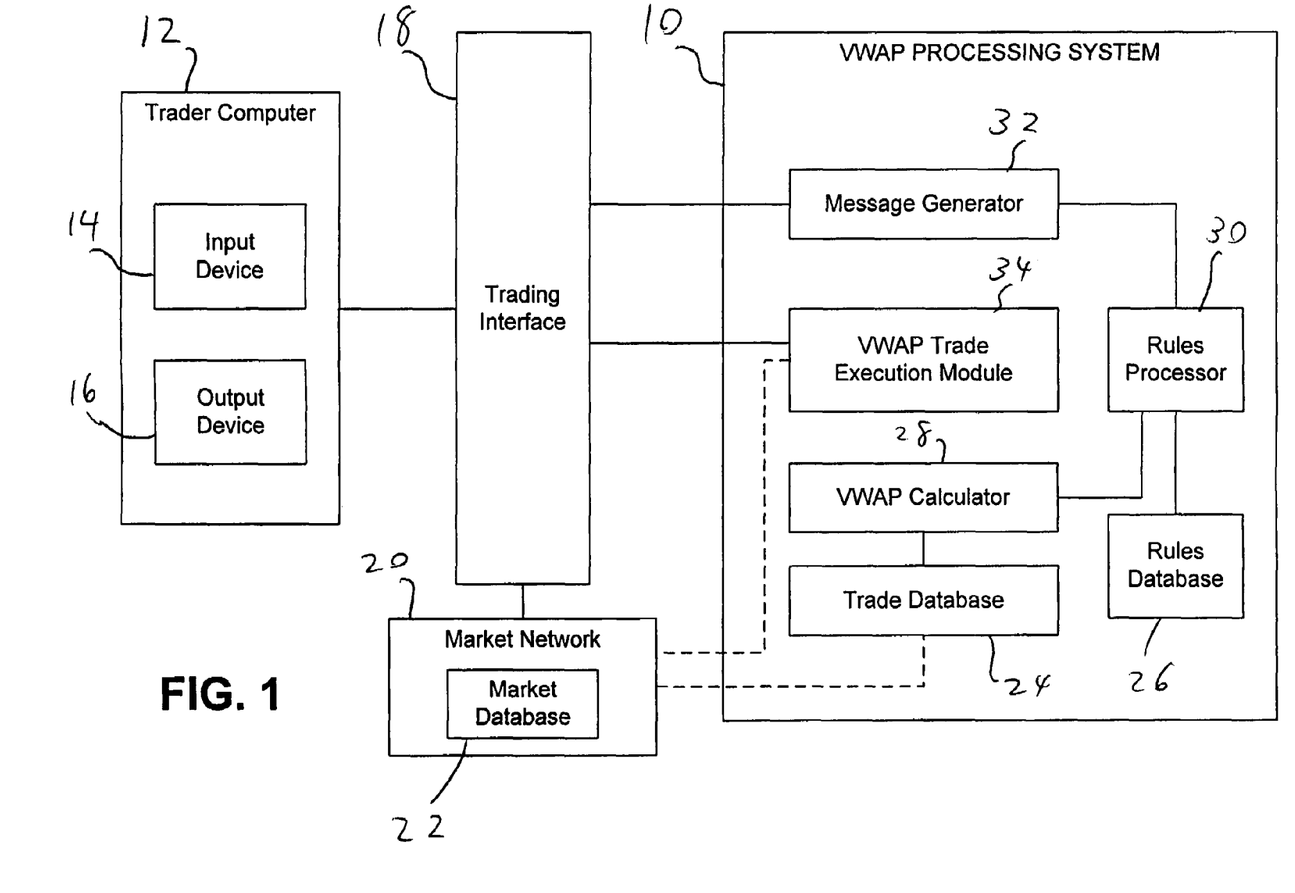
FIG. 1 illustrates a block diagram of a trading environment including a VWAP processing system.

Referring to FIG. 1, a VWAP processing system 10 is incorporated and/or connected to an electronic financial trading environment, in which a trader uses a respective trading computer 12 with an input device 14 and an output device 16 for engaging in trades through a trading interface 18 to at least one market network 20 having a market database 22. For example, the trading computer 12 may be a stand-alone terminal including a graphic user interface (GUI) provided by the devices 14 and 16. Examples of such input devices include a keyboard and/or mouse, and an example of such output devices is a video display (e.g. computer monitor). The trading computer 12 provides trading data to the device 16 from the market network 20, and associated market database 22 relating to the market accessed by the trading computer 12. Available markets and market databases may include international equity securities, treasuries, or other financial instruments. A market database 22 may cover orders of entire economic sectors, entire markets, and even entire countries and groups of countries.

The trading interface 18 may be, for example, the "BLOOMBERG PROFESSIONAL" interface. That interface may include, for example, software and/or access privileges to use the "BLOOMBERG TRADEBOOK" functions of the "BLOOMBERG PROFESSIONAL" system through executable text and pop-up windows for messaging, input fields, and input and/or information display windows. Some "BLOOMBERG TRADEBOOK" functionality is described, for example, in commonly assigned U.S. application Ser. No. 09/412,408, filed Oct. 5, 1999, which is incorporated herein by reference.

To implement the VWAP processes and functions described herein, the VWAP processing system 10 may be connected to and/or incorporated into the "BLOOMBERG PROFESSIONAL" system as hardware and/or software modules. The VWAP processing system 10 receives market data from the market network 20 through connections via the trading interface 18. Alternatively or in addition, the VWAP processing system 10 may be connected to the market network 20 directly, primarily for data collection and transfer as described herein. Network security mechanisms such as firewalls may be incorporated into the trading interface 18 and/or the VWAP processing system 10 to ensure information security and integrity.

The VWAP processing system 10 also includes a trade database 24, a rules database 26, a VWAP calculator 28, a rules processor 30, and a message generator 32. The VWAP processing system 10 may also include a VWAP trade execution module 34 which responds to trade selections of the trader to execute trades through the trading interface 18 and/ or directly to the market network 20. These components 24-34 may be implemented in hardware and/or software using known processing devices and methods, such as compiled source code written in, for example, C++ for use in the trading environment, such as Internet-based systems and other open systems, as well as proprietary trading systems such as the "BLOOMBERG PROFESSIONAL" system.

The trade database 24 stores relevant market and trading data received from the market database 22, such as raw prices for financial instruments, and identifies anonymous aggregate orders of traders and matched trades. The VWAP calculator 28 regularly processes the market and trading data in the trade database 24 for determining the volume weighted average price values of a plurality of financial instruments over one or more defined time periods, which may be part of a trading session or day, one or more trading sessions or one or more trading days. The defined time period for a given VWAP type may also be the time period from the time of the order match to the end of the trading session, or day, or part thereof, or one or more trading sessions and/or days. The VWAP calculator 28 also performs settlement calculations to determine a settlement price of a trade of matched orders for a particular security after a specific point in time, such as after close of the market based on the defined time period for the particular VWAP type.

The rules processor 30 determines whether predetermined rules and/or customized rules of system administrators or individual traders have been met for each trade processed by the VWAP calculator 28. For example, a trader may have default settings to have the VWAP processing system 10 automatically determine for the trader whether a VWAP of a selected order for a security would match the orders of other market participants in the particular security and/or comparable securities in the same or different markets, according to the data obtained from the market databases 22 of other markets and market networks 20. One such rule involves implementing a queue on the basis of time priority without regard to order size, such that the first order is matched with a contra order or orders for the specified quantity of securities, before subsequent orders on the same side of the market with matching quantities are matched with contra orders, and then the next order in the queue is matched with the next available contra order(s), and so on. This may implement first-in, first-out (FIFO) queuing and filling of orders, while other rules may implement other queuing and order-processing techniques.

Another rule may provide that unfilled bids and offers stay on the market for subsequent trading sessions or days. In an alternative embodiment, VWAP determination may also be rule-based and implemented by rules processor 30.

Once a rule is processed and determined by the rules processor 30 to have been met, the rules processor 30 causes the message generator 32 to have a message sent through the trading interface 18 to the output device 16 of the trader for example, as a text message displayed on an output device 16, optionally with visual flashing and/or sound indicators, to notify the trader that the matching order is being, has been, or should be executed. The text message may also pop-up in a window of the output device 16 of the trader. The trades are executed automatically if the orders match the respective trading criteria set by the parties.

In another embodiment of the VWAP processing system 10, dynamic, real-time viewing and access are provided to the output device 12 of a continuous market of displayed bids and offers to trade securities based on the VWAP in different markets, such as displayed bids and offers in international equity markets accessible through one or more corresponding market networks 20.

The system 10 provides improved order processing by being continuous, that is, by receiving submitted orders and accommodating baskets of securities as well as individual securities, and then updating the VWAP monitor to reflect the newly submitted orders, and then by continually matching orders, for example, through the "BLOOMBERG TRADEBOOK" system.

Such displayed trade data for available bids and offers may display only the visible or displayed portion of a total transaction on the VWAP monitor. For example, using reserves available through, for example, the "BLOOMBERG TRADEBOOK" system, a trader may make an offer with a displayed portion and a reserve portion. The reserve portion is displayed only to the trader inputting the order and not to other traders generally on the VWAP monitor.

In another embodiment, traders using the VWAP processing system 10 may participate in VWAP-based trading sessions, in which each session has an associated period in which the VWAP is determined, such as a span of hours or multiple day periods. Traders thus have the ability to implement a cross or match in pre-market, first, and/or second VWAP trading sessions.

Figure 2:
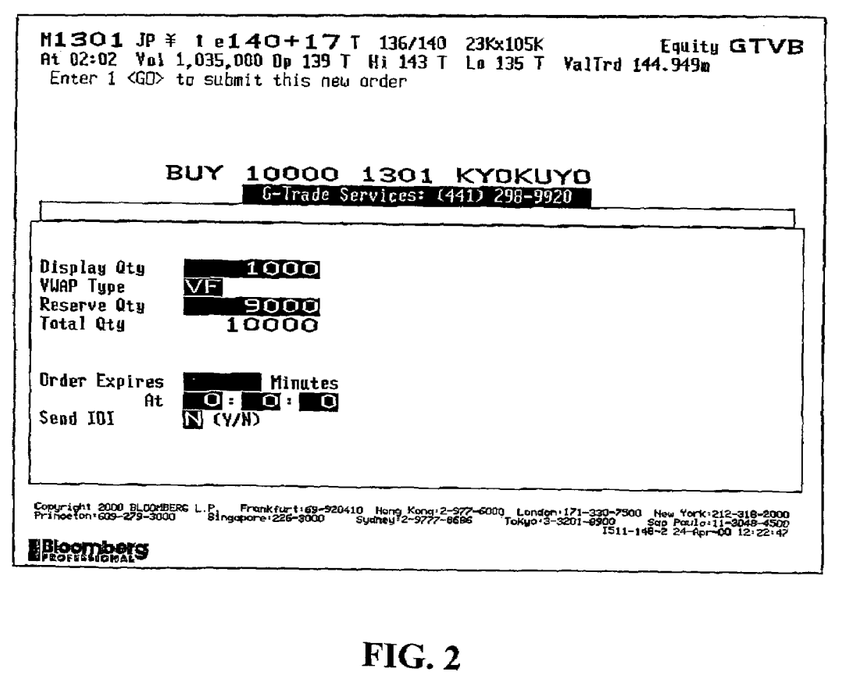
FIG. 2 illustrates an example screen display of a VWAP order ticket.

Operation of a preferred embodiment of the VWAP processing system 10 is described below in connection with the "BLOOMBERG TRADEBOOK" system. The VWAP trade execution module 34 is responsive to selections by the trader through the ticket of FIG. 2 to execute matching transactions automatically through the "BLOOMBERG PROFESSIONAL" trading interface 18 and/or directly to the market network 20. The VWAP processing system responds to order-entry commands, for example,

BUY 10000 1301<GO> which may be a text input at a "BLOOMBERG TRADEBOOK" screen. The example command indicates that the trader desires to buy a total quantity of 10,000 shares of the security identified by the security number "1301," which may be, for example, a stock in the Japanese market, priced in yen. In response to the input command, the system 10 generates an order ticket, for example, as illustrated in FIG. 2, in which a trader inputs quantity values for the specified security, including displayed and reserve amounts, for which the trader is willing to engage. The trader also specifies the type of VWAP for the specified security, with the VWAP types being indicated on the basis of, for example, the duration over which the VWAP is calculated.

As further described with reference to FIGS. 3-4, the VWAP may be measured over a full day (VWAP type VF), over a predetermined first session (VWAP type V1), over a predetermined second session (VWAP type V2), or over a point-of-trade period (VWAP type VP) measured from the time of the matched order to the end of the agreed upon time period, or other time periods as specified by the system and/or by the trader.

The system 10 may provide for expiration of an order in accordance with expiration data input to the trading computer 12. Such expiration data may be input using the ticket in FIG. 2. The expiration data may be a set amount of time or a deadline after which the order expires. Corresponding input fields are provided on the ticket depicted in FIG. 2 to receive such expiration data. In conjunction with "BLOOMBERG TRADEBOOK," the trader may also use indications of interest (IOI) functions of "BLOOMBERG TRADEBOOK" to seek counterparties and to fill orders with other traders.

Figure 3:
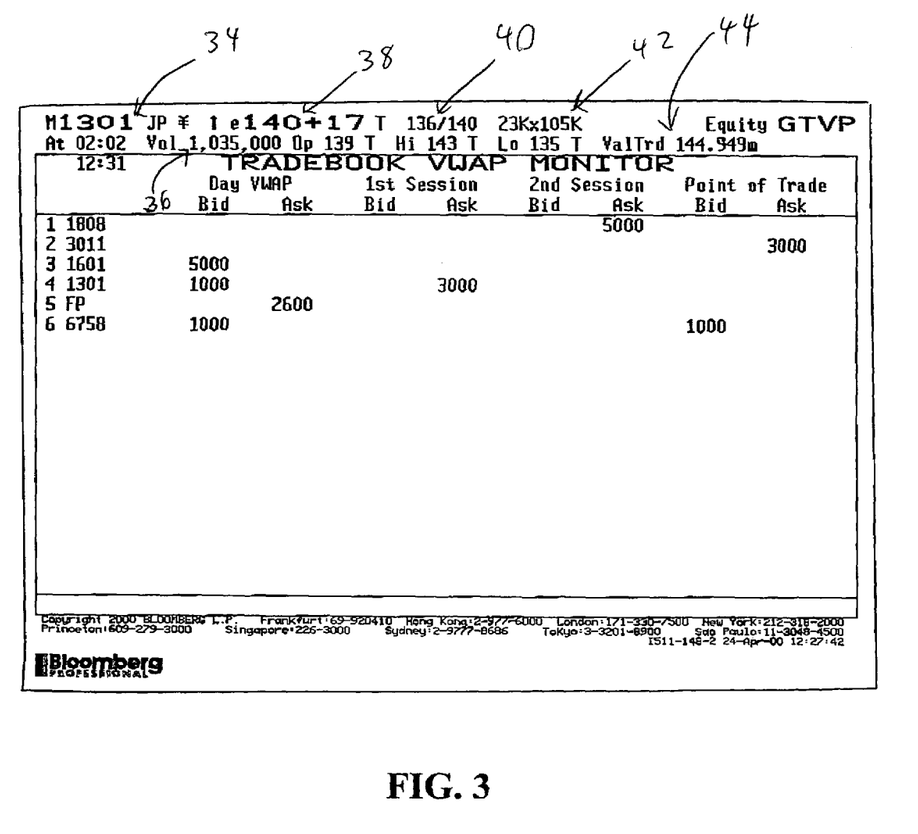
FIG. 3 illustrates an example screen display of a VWAP monitor.

As shown in FIG. 3, a VWAP monitor screen may be provided to the output device 16, for example, to allow a trader to see the liquidity of different securities, for example, identified by security IDs such as "1808" and "1601." Once a trader selects a security, such as by entering the security ID on a keyboard input device 14 by typing "1301" or by clicking with a mouse input device 14 mouse, the text "1301" showing the security ID for the selected security, an order ticket as shown in FIG. 2 is displayed. Alternatively, clicking the row number "4" substantially adjacent to the selected security, that is, adjacent to the text "1301," causes the order ticket in FIG. 2 to be displayed.

The trader may thus monitor his/her orders through the monitor screen of FIG. 3 to view the current trading data for the selected security with the corresponding security ID 34. For example, the VWAP monitor screen displays (FIG. 3) the current trading volume 36 in the security on the relevant market; the current value 38 of the last reported sale price on the relevant market; the reported bid/ask spread 40; the current quoted sizes 42 of the bids and asks; and the total value 44 traded, such as the sum of the product of the prices and the volumes for each completed trade.

Through the VWAP monitor screen in FIG. 3, a trader may view the volumes of the bids and asks for each security for each corresponding VWAP type, such as the day VWAP for the market trading day (VF) VWAP; for the first session (V1) VWAP and second session (V2) VWAP; and for the point-of-trade (VP) from the matching of the trader's order. For example, if a trader inputs a display quantity bid of 1,000 shares (FIG. 2 ticket) or using the full day VWAP (VF), this bid is in turn displayed on the fourth line of the day VWAP as entry "1000".

The VWAP monitor screen (FIG. 3) allows a trader to monitor his/her orders in relation to other orders in that security. A trader's order is matched through the trading interface 18, such as using the "BLOOMBERG TRADEBOOK" system, as described in commonly assigned U.S. application Ser. No. 09/412,408, filed Oct. 5, 1999, which is incorporated herein by reference.

One or more VWAP monitor screens (FIG. 3) may be accessible to a trader to display a continuous market of displayed bids and offers in different markets and/or countries. Country-specific VWAP monitor screens displaying the country-wide volumes of VWAP-based orders may be provided to allow traders to view the available bids and offers in view of the overall market in that country for various securities.

Figure 4:
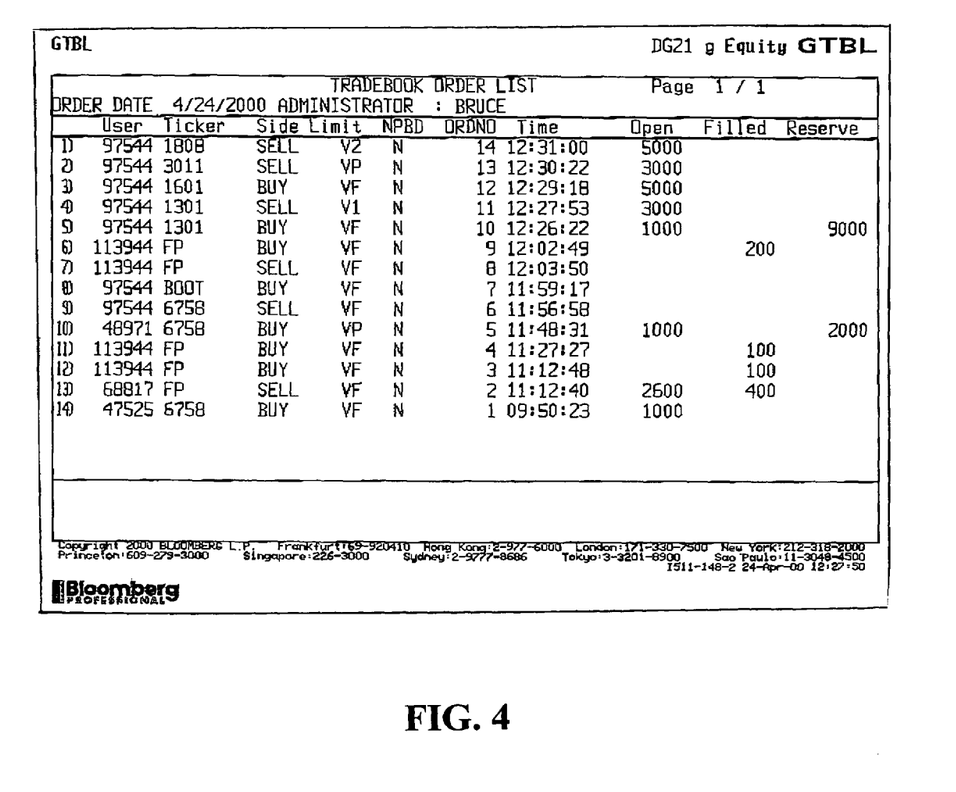
FIG. 4 illustrates an example screen display of an order list of executions.

FIG. 4 illustrates an example "BLOOMBERG TRADEBOOK" screen display of an order list for a trader's activities, which may be generated at the end of a VWAP session and/or at the end of the market trading day, with which a trader may compare his/her trading activities for open and filled orders listed by ticker/security ID and by order quantity. From the order list of FIG. 4, trading reports may be generated. The VWAP processing system 10 may also generate a screen which provides the trader with settlement prices of financial instruments bought and sold on the basis of the VWAP after the respective VWAP session ends.

The matching may occur as trades are formed. For instance, a buy order for 500 shares may be matched against five sell orders for 100 shares each. In other embodiments, the matching may occur at the end of the day, and may use a number of different matching rules to improve efficiency. For instance, if there is a buy order of 500 shares and five buy orders of 100 shares each, and corresponding sell orders of 500, 100, 100, 100, 100, and 100 shares, all of the identical VWAP type, it may be most efficient to match corresponding trades to each order, so that the number of settlement transactions is reduced.

In one embodiment, the VWAP processing system 10 matches orders continuously to allow market participants seeking the same type of VWAP order execution to obtain the best VWAP-based transactions. Other embodiments may implement non-continuous and periodic matching.

Numerous modifications and substitutions may be made without departing from the spirit of the invention. Accordingly, the invention has been described by way of illustration rather than limitation.

The invention claimed is:

1. A method for electronically conducting trades in securities, the method comprising:
   electronically transmitting from a computerized volume-weighted-average price (VWAP) processing system, to a trading computer that comprises at least one processor, at least one input device that is operatively coupled to at least one of the processors, and at least one output device that is operatively coupled to at least one of the processors, order information that comprises information corresponding to a plurality of buy and sell orders that can be matched with each other for trading, each of the orders being either an order to buy a security at a VWAP or to sell the security at a VWAP;
   in response to receipt of the order information by the trading computer, causing the order information to be displayed on at least one of the output devices in a manner that comprises displaying individually all of the orders at a single time;
   matching, by a rules processor within the VWAP processing system, of at least two of the displayed orders with each other for trading, at least one of the matched orders being a buy order and at least one of the matched orders being a sell order;
   pricing, by a VWAP calculator within the VWAP processing system, the matched orders at a VWAP, the VWAP being a weighted average of a plurality of prices of a plurality of respective trades that have been executed prior to the calculation of the VWAP; and
   executing the matched orders by trading the matched orders against each other at the VWAP.

2. The method of claim 1, wherein matching orders comprises matching orders continuously and/or non-continuously.

3. The method of claim 1 or 2, wherein the information of an order of a trader displayed to that trader includes a displayed quantity also displayed to other traders and a reserve quantity not displayed to other traders.

4. The method of claim 1 or 2, wherein the information of a displayed order includes a displayed quantity and a non displayed reserve quantity.

5. The method of claim 1 or 2, wherein each of the orders has a respective displayed quantity and a non-displayed reserve quantity associated therewith.

6. The method of claim 5, further comprising receiving, by trading computer through at least one of the input devices, of inputs from traders specifying the displayed quantity and the reserve quantity.

7. The method of claim 5, further comprising receiving, by trading computer through at least one of the input devices, of inputs from traders specifying a type of VWAP for which to perform the pricing.

8. The method of claim 7, wherein the type of VWAP corresponds to an associated session from which a settlement price based on a VWAP of the session.

9. The method of claim 1 or 2, wherein displaying includes displaying information corresponding to the orders without identification of a source of the orders, thereby providing anonymity to traders engaging in the orders.

10. The method of claim 1, wherein pricing the matched orders comprises providing the VWAP based on a defined time period.

11. A method for electronically conducting trades in securities, the method comprising:
   electronically transmitting from a computerized volume-weighted-average price (VWAP) processing system, to a trading computer that comprises at least one processor, at least one input device that is operatively coupled to at least one of the processors, and at least one output device that is operatively coupled to at least one of the processors, order information that comprises information corresponding to a plurality of buy and sell orders that can be matched with each other for trading, each of the orders being either an order to buy a security at a VWAP or to sell the security at a VWAP;
   in response to receipt of the order information by the trading computer, causing the order information to be displayed on at least one of the output devices in a manner that comprises displaying individually all of the orders at a single time;
   matching, by a rules processor within the VWAP processing system, of at least two of the displayed orders with each other for trading, at least one of the matched orders being a buy order and at least one of the matched orders being a sell order;
   providing, by a VWAP calculator within the VWAP processing system, a VWAP for each matched order, the VWAP being a weighted average of a plurality of prices of a plurality of respective trades that have been executed prior to the calculation of the VWAP; and
   executing the matched orders by trading the matched orders against each other at the VWAP.

12. The method of claim 11, wherein matching orders comprises matching orders continuously and/or non-continuously.

13. The method of claim 11, wherein providing the VWAP comprises providing the VWAP based on a defined time period.

14. The method of claim 10 or 13, wherein the defined time period is from a point of a trade of matched orders to an end of a day.

15. The method of claim 14, wherein the end of the day is an official termination of trading in a respective market of the security which is the subject of the matched orders.

16. The method of claim 14, wherein the end of the day is an end of a time period determined by a trader or the VWAP processing system.

17. The method of claim 10 or 13, wherein the defined time period extends over an entire day.

18. The method of claim 10 or 13, wherein market activity is divided into at least a first session and a second session, and the time period for measuring the VWAP extends over one of the sessions.

19. The method of claim 10 or 13, wherein pricing includes determining settlement prices of matched orders from the VWAP over a time period and from a basis point adjustment of the VWAP.

20. A method of trading securities comprising:
receiving a plurality of buy and sell orders, which can be matched with one another for trading, for a security by a computerized volume-weighted-average price (VWAP) processing system, each of the orders being either an order to buy the security at a VWAP or to sell the security at a VWAP;
electronically transmitting information regarding the orders in approximately real time from the VWAP processing system to a trading computer that receives the transmitted information, the trading computer comprising at least one processor, at least one input device operatively coupled to the processor, and at least one output device operatively coupled to the processor;
in response to receiving the information transmitted from the VWAP processing system, causing at least one of the output devices to display continuously matched and unmatched orders of the received buy and sell orders and information regarding the orders on the trading system in approximately real-time;
continuously matching by the VWAP processing system of a received buy order to a received sell order to form a trade;
each matched order of the trade including a defined time period over which a VWAP is to be computed for the trade; and
following the expiration of the VWAP time period, the VWAP processing system executing the trade at the VWAP of the security over the VWAP time period, the VWAP, calculated by a VWAP calculator within the VWAP processing system, being a weighted average of a plurality of prices of a plurality of respective trades that were executed during the VWAP trading period.

21. The method of claim 20, wherein the time period is from a point of trade of the matched orders to an end of a day.

22. The method of claim 21, wherein the end of the day is an official termination of trading in a respective market of the security which is the subject of the matched orders.

23. The method of claim 21, wherein the end of the day is an end of the time period determined by a trader or the VWAP processing system.

24. The method of claim 20, wherein the time period extends over an entire day.

25. The method of claim 20, wherein market activity is divided into at least a first session and a second session, and the time period extends over one of the sessions.

26. A trading system for electronically conducting trades in securities, the system comprising:
a trading system that comprises at least one processor that is operatively coupled to a plurality of display devices for separately and simultaneously displaying information corresponding to respective buy and sell orders that can be matched with each other for trading, each of the orders being either an order to buy a security at a volume-weighted-average price (VWAP) or to sell the security at a VWAP;
a trade matching system, comprising at least one processor and a memory that is operatively coupled to at least one of the processors, the memory encoded with instructions that are executed by at least one or the processors, thereby causing the trade matching system to continuously match with one another the orders about which the information is displayed;
a VWAP processing system, comprising at least one processor and a memory that is operatively coupled to at least one of the processors, the memory encoded with instructions that, when executed by at least one of the processors, cause the VWAP processing system to price the matched orders at a VWAP that is a weighted average of a plurality of prices of a plurality of respective trades that have been executed prior to the calculation of the VWAP; and
an electronic communications network configured to permit communication between and among the trading system, the trade matching system, and the VWAP processing system.

27. A method for electronically conducting trades in securities, the method comprising:
electronically transmitting from a computerized volume-weighted-average price (VWAP) processing system, to a trading computer that comprises at least one processor, at least one input device that is operatively coupled to at least one of the processors, and at least one output device that is operatively coupled to at least one of the processors, order information that comprises information corresponding to a plurality of buy and sell orders that can be matched with each other for trading, each of the orders being either an order to buy a security at a VWAP or to sell the security at a VWAP;
in response to receipt of the order information by the trading computer, causing the order information to be displayed on at least one of the output devices in a manner that comprises displaying individually all of the orders at a single time;
continuously matching, by a rules processor within the VWAP processing system, of at least two of the displayed orders with each other for trading, at least one of the matched orders being a buy order and at least one of the matched orders being a sell order; and
pricing, by a VWAP calculator within the VWAP processing system, the matched orders at a VWAP, the VWAP being a weighted average of a plurality of prices of a plurality of respective trades that have been executed prior to the calculation of the VWAP; and
executing the matched orders by trading the matched orders against each other at the VWAP.

28. The method of claim 27, wherein the VWAP is determined for multiple days and/or multiple sessions of market trading activity.

29. The method of claim 27, wherein the VWAP is determined from a point of trade of the matched orders to a specified time.

30. The method of claim 29, wherein the specified time is an end of a session of market activity.

31. The method of claim 27, wherein pricing the matched orders comprises providing the VWAP based on a defined time period.

32. The method of claim 31, wherein the defined time period is from a point of trade of the matched orders to an end of a day.

33. The method of claim 32, wherein the end of the day is an official termination of trading in a respective market of the security which is the subject of the matched orders.

34. The method of claim 33, wherein the end of the day is an end of the time period determined by a trader or the VWAP processing system.

35. The method of claim 31, wherein the defined time period extends over an entire day.

36. The method of claim 31, wherein market activity is divided into at least a first session and a second session, and the time period for measuring the VWAP extends over one of the sessions.

37. The method of claim 27, wherein the VWAP is determined from a specified start time to a specified end time.

38. The method of claim 37, wherein the specified start time is selected from a past time, a present time, or a future time relative to a time of matching of the orders.

39. The method of claim 38, wherein the specified end time is a future time relative to the time of matching of the orders.

40. The method of claim 39, further comprising promoting entry of orders at a present time for matching and pricing with a VWAP determined at the specified end time in the future.

41. A method for electronically conducting trades in securities, the method comprising:

electronically transmitting from a computerized volume-weighted-average price (VWAP) processing system, to a trading computer that comprises at least one processor, at least one input device that is operatively coupled to at least one of the processors, and at least one output device that is operatively coupled to at least one of the processors, order information that comprises information corresponding to a plurality of buy and sell orders that can be matched with each other for trading, each of the orders being either an order to buy a security at a VWAP or to sell the security at a VWAP;

in response to receipt of the order information by the trading computer, causing the order information to be displayed on at least one of the output devices in a manner that comprises displaying individually all of the orders at a single time;

matching, by a rules processor within the VWAP processing system, of at least two of the displayed orders with each other for trading, at least one of the matched orders being a buy order and at least one of the matched orders being a sell order, the matching taking place at multiple discrete times;

pricing, by a VWAP calculator within the VWAP processing system, the matched orders at a VWAP, the VWAP being a weighted average of a plurality of prices of a plurality of respective trades that have been executed prior to the calculation of the VWAP; and executing the matched orders by trading the matched orders against each other at the VWAP.

* * * * *

UNITED STATES PATENT AND TRADEMARK OFFICE
CERTIFICATE OF CORRECTION

| | | |
|---|---|---|
| PATENT NO. | : 7,689,495 B1 | Page 1 of 1 |
| APPLICATION NO. | : 09/562506 | |
| DATED | : March 30, 2010 | |
| INVENTOR(S) | : Bang et al. | |

It is certified that error appears in the above-identified patent and that said Letters Patent is hereby corrected as shown below:

On title page Item (75) Inventors: "Bang Kim, Englewood, NJ (US); Slone Jonathan, New York, NY (US)" should read: --Kim Bang, Englewood, NJ (US); Jonathan Slone, New York, NY (US)--

Signed and Sealed this

Fifteenth Day of June, 2010

David J. Kappos
*Director of the United States Patent and Trademark Office*